United States Patent
Lee et al.

(10) Patent No.: US 9,801,291 B2
(45) Date of Patent: Oct. 24, 2017

(54) IMAGE DISPLAY DEVICE

(71) Applicant: LG ELECTRONICS INC., Seoul (KR)

(72) Inventors: Gwangwon Lee, Seoul (KR); Choongsuk Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/913,663

(22) PCT Filed: Mar. 7, 2014

(86) PCT No.: PCT/KR2014/001882
§ 371 (c)(1),
(2) Date: Feb. 22, 2016

(87) PCT Pub. No.: WO2015/030329
PCT Pub. Date: Mar. 5, 2015

(65) Prior Publication Data
US 2016/0212864 A1  Jul. 21, 2016

(30) Foreign Application Priority Data

Aug. 30, 2013  (KR) .................. 10-2013-0104321

(51) Int. Cl.
*H05K 5/00* (2006.01)
*G06F 1/16* (2006.01)
(Continued)

(52) U.S. Cl.
CPC ......... *H05K 5/0017* (2013.01); *G06F 1/1652* (2013.01); *G09F 9/00* (2013.01);
(Continued)

(58) Field of Classification Search
CPC .... H05K 5/0017; H05K 5/0217; H05K 1/028; H05K 1/181; H05K 2201/10128;
(Continued)

(56) References Cited

U.S. PATENT DOCUMENTS

| | | |
|---|---|---|
| 2007/0218411 A1 | 9/2007 | Sakata |
| 2013/0155655 A1 | 6/2013 | Lee et al. |

(Continued)

FOREIGN PATENT DOCUMENTS

| | | |
|---|---|---|
| CN | 101083144 A | 12/2007 |
| CN | 103154857 A | 6/2013 |

(Continued)

*Primary Examiner* — Anthony Haughton
*Assistant Examiner* — Ingrid Wright
(74) *Attorney, Agent, or Firm* — Dentons US LLP (57) ABSTRACT

An image display device comprises: a flexible display unit configured to be bent, by an external force, in a first state and a second state where the flexible display unit has different radiuses of curvature; and a middle cabinet assembly configured to cover side surfaces of the flexible display unit, wherein the middle cabinet assembly comprises: a first middle cabinet coupled to the flexible display unit, and disposed to cover a first side of the flexible display unit; and a second middle cabinet disposed to cover a second side of the flexible display unit, the second side perpendicular to the first side, and the second middle cabinet configured to perform a relative motion with respect to the first middle cabinet when the flexible display unit is transformed between the first state and the second state.

13 Claims, 9 Drawing Sheets

(51) Int. Cl.
*G09F 9/00* (2006.01)
*G09F 9/30* (2006.01)
*H04N 5/64* (2006.01)
*G02F 1/1333* (2006.01)

(52) U.S. Cl.
CPC ............... *G09F 9/301* (2013.01); *H04N 5/64* (2013.01); *G02F 1/133305* (2013.01); *G02F 2001/133328* (2013.01)

(58) Field of Classification Search
CPC ....... H05K 2201/10136; H05K 5/0204; H05K 7/14; G06F 1/1652; G06F 1/1637; G06F 1/1694; G06F 2203/04102; G06F 1/1601; G06F 1/1641; G06F 2200/1612; H04N 5/64; G09F 9/30; G09F 9/301; G09F 15/0025; G09F 9/00
USPC ............ 361/679.01, 679.09, 679.26, 679.27, 361/679.21, 679.22; 362/97.1; 345/173; 349/58–60, 150
See application file for complete search history.

(56) References Cited

U.S. PATENT DOCUMENTS

2013/0207946 A1    8/2013   Kim et al.
2013/0314611 A1*  11/2013   Okutsu ................... H04N 5/64
                                                                  348/739

FOREIGN PATENT DOCUMENTS

| KR | 2003-0029188 A | 4/2003 |
| KR | 10-2012-0008666 A | 2/2012 |
| KR | 10-2013-0062992 A | 6/2013 |
| WO | 2012/102349 A1 | 6/2014 |

* cited by examiner

IMAGE DISPLAY DEVICE

This application is a National Stage Application of International Application No. PCT/KR2014/001882, filed on Mar. 7, 2014, which claims the benefit of Korean Patent Application No. 10-2013-0104321, filed on Aug. 30, 2013, all of which are hereby incorporated by reference in their entirety for all purposes as if fully set forth herein.

TECHNICAL FIELD

The present invention relates to an image display device having a flexible display unit.

BACKGROUND ART

In general, an image display device includes both a device of recording and/or reproducing images and a device of recording and/or reproducing audio. Examples of the image display device may include a TV set, a monitor, a projector, a tablet, a smart phone and the like.

As it becomes multifunctional, the image display device can be allowed to capture still images or moving images, play music or video files, play games, receive broadcasts and the like, so as to be implemented as an integrated multimedia player.

Many efforts are undergoing to support and enhance various functions such as a multimedia player in view of hardware or software improvements. Structural changes and improvements for simplifying an assembly structure of the image display device may be included in such attempts corresponding to the hardware improvement.

As an example of the structural changes and improvements, an image display device having a flexible display unit which is transformable in shape is being actively researched and proposed. A middle cabinet assembly which encloses a panel is configured to be bent together with the flexible display unit, in a case where the flexible display unit is bent. In this case, right and left side surfaces of the flexible display unit may contact an inner side wall of the middle cabinet assembly which faces the flexible display unit, due to different bent degrees between the flexible display unit and the middle cabinet assembly. This may cause damages of the panel. Therefore, a structure for preventing such damages of the panel may be considered.

DISCLOSURE OF THE INVENTION

Therefore, an object of the present invention is to provide an image display device capable of protecting a panel by having a structure where side surfaces of a flexible display unit do not contact an inner side wall of a first middle cabinet which faces the flexible display unit, even if the flexible display unit is transformed.

To achieve these and other advantages and in accordance with the purpose of the present invention, as embodied and broadly described herein, there is provided an image display device, comprising: a flexible display unit configured to be bent, by an external force, in a first state and a second state where the flexible display unit has different radiuses of curvature; and a middle cabinet assembly configured to cover side surfaces of the flexible display unit, wherein the middle cabinet assembly comprises: a first middle cabinet coupled to the flexible display unit, and disposed to cover a first side of the flexible display unit; and a second middle cabinet disposed to cover a second side of the flexible display unit, the second side perpendicular to the first side, and the second middle cabinet configured to perform a relative motion with respect to the first middle cabinet when the flexible display unit is transformed between the first state and the second state.

In an embodiment of the present invention, the first state may indicate a state where the flexible display unit is flat, and the second state may indicate a state where two sides of the flexible display unit are forward bent in a curved shape. The relative motion may be performed between the first state and the second state.

The second middle cabinet may have a different radius of curvature from the flexible display unit in the second state.

An end of the first middle cabinet may be configured to be exposed to outside in the second state, but to be covered in the first state.

An end of the second middle cabinet may have the same plane as one surface of the first middle cabinet in the first state.

An end of the second middle cabinet may be configured to be inserted into a groove of the first middle cabinet, and to be movable to a direction for separation from the groove when the flexible display unit is transformed to the second state from the first state.

The end of the second middle cabinet may be inserted into the groove of the first middle cabinet in the first state, and may be movable to a direction for separation from the groove when the flexible display unit is transformed to the second state from the first state. The end of the second middle cabinet, which has been separated from the groove in the second state, may have the same plane as the first middle cabinet.

According to another embodiment of the present invention, the flexible display unit may comprise: a panel configured to output visual information; and a module cover configured to cover a rear surface of the panel for support, and coupled to the middle cabinet assembly.

The module cover may be fixedly-coupled to the first middle cabinet, and may be coupled to the second middle cabinet such that the second middle cabinet performs a relative motion.

The middle cabinet assembly may further include a fixing member disposed to cover an end of the first middle cabinet and an end of the second middle cabinet, and configured to couple the first middle cabinet and the second middle cabinet thereto so that they can perform a relative motion with respect to each other.

A first nut protruding from the first middle cabinet may be inserted into a first hole of the fixing member. A first coupling member may be coupled to the first nut, such that the fixing member is fixed to the first middle cabinet.

A second nut protruding from the second middle cabinet may be inserted into a second hole of the fixing member. A second coupling member may be coupled to the second nut, and may be slidable on one surface of the module cover when the second middle cabinet performs a relative motion.

A third nut protruding from the module cover may be inserted into a third hole of the fixing member, and a through hole of the second middle cabinet. A third coupling member may be coupled to the third nut, and may be moved to be close to or far from the second coupling member during the relative motion.

MODES FOR CARRYING OUT THE PREFERRED EMBODIMENTS

An image display device according to the present invention will now be given in detail with reference to the accompanying drawings.

For the sake of brief description with reference to the drawings, the same or equivalent components may be provided with the same reference numbers, and description thereof may not be repeated. A singular expression in this specification may include a plural meaning unless it is distinctively expressed.

An image display device according to the present invention may include both a device of recording and/or reproducing images and a device for recording and/or reproducing audio by receiving and outputting broadcasts. Hereinafter, a TV as an example of the image display device will be illustrated.

Figure 1:
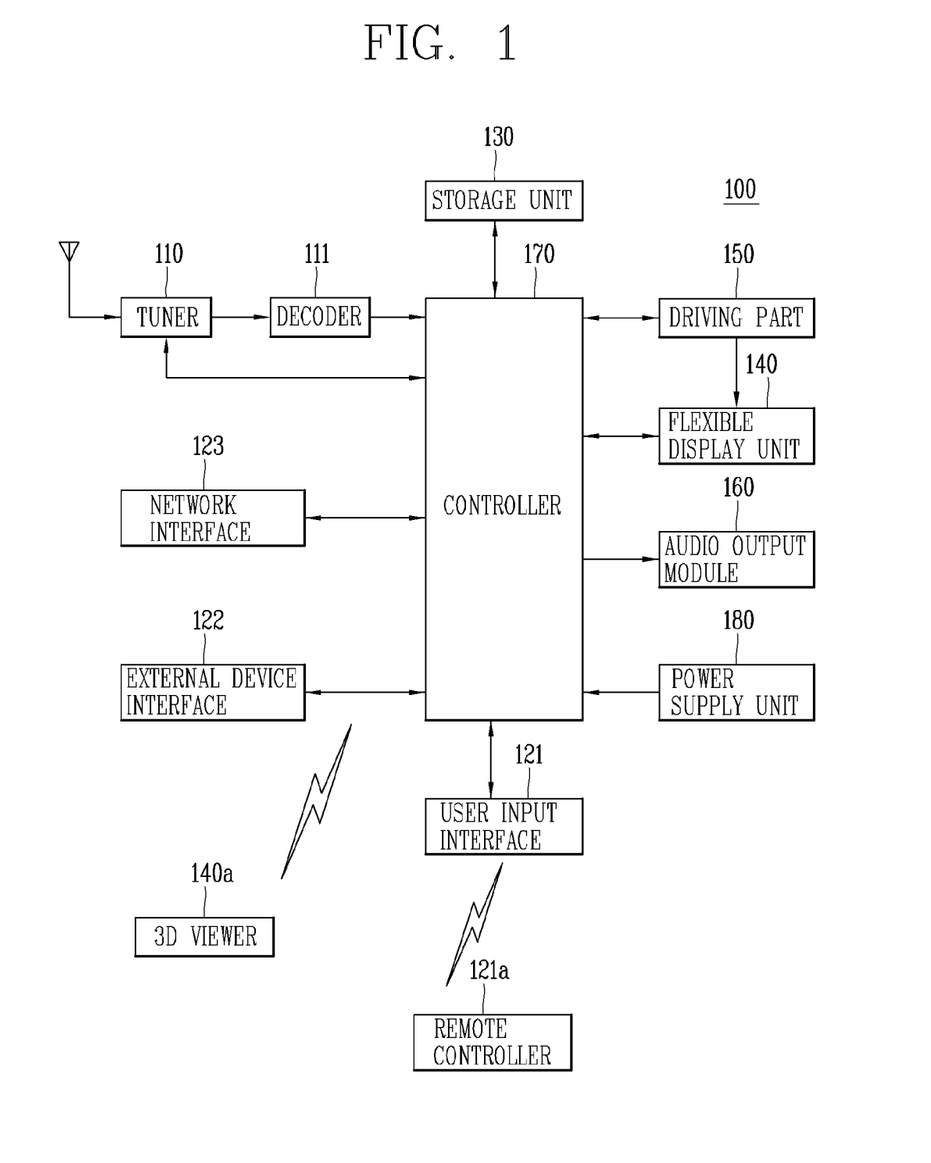
FIG. 1 is a block diagram illustrating an image display device and a remote controller according to the present invention.

FIG. 1 is a block diagram of an image display device 100 and a remote controller 121a according to the present invention.

As illustrated in FIG. 1, the image display device 100 may include a tuner 110, a decoder 111, an external device interface 122, a network interface 123, a storage unit 130, a user input interface 121, a controller 170, a flexible display unit 140, a driving part 150, an audio output module 160, a power supply unit 180, and a 3D viewer 140a.

The tuner 110 may select a radio frequency (RF) broadcast signal, which corresponds to a channel selected by a user, among RF broadcast signals received through an antenna, or every pre-stored channel. The tuner 110 may also convert the selected RF broadcast signal into a medium frequency signal or a baseband video or audio signal.

For example, when the RF broadcast signal selected is a digital broadcast signal, the tuner 110 may convert the RF broadcast signal into a digital IF signal (DIF). On the other hand, when the RF broadcast signal is an analog broadcast signal, the tuner 110 may convert the RF broadcast signal into an analog baseband video or audio signal (CVBS/SIF). That is, the analog baseband image or audio signal (CVBS/SIF) outputted from the tuner 110 may be inputted directly into the controller 170.

Also, the tuner 110 may receive a signal carrier RF broadcast signal according to an advanced television systems committee (ATSC) standard or a multi-carrier RF broadcast signal according to a digital video broadcasting (DVB) standard.

Meanwhile, the tuner 110 may sequentially select RF broadcast signals of all the broadcast channels stored through a channel memory function, of RF broadcast signals received via an antenna, and convert those RF broadcast signals into a medium frequency signal or a baseband video or audio signal.

The decoder 111 may execute a decoding operation by receiving a digital IF signal (DIF) converted in the tuner 110.

For example, when the digital IF signal outputted from the tuner 110 is a signal according to the ATSC standard, the decoder 120 may perform 8-vestigal side band (8-VSB) demodulation. Here, the decoder 111 may also perform trellis decoding, de-interleaving, reed Solomon decoding and the like. To this end, the decoder 120 may include a trellis decoder, de-interleaver, a reed Solomon decoder and the like.

As another example, when the digital IF signal (DIF) outputted from the tuner 110 is a signal according to the DVB standard, the decoder 111 may perform a coded orthogonal frequency division modulation (COFDMA) demodulation. Here, the decoder 111 may also perform convolution decoding, de-interleaving, reed Solomon decoding and the like. To this end, the decoder 111 may include a convolution decoder, a de-interleaver, a reed Solomon decoder and the like.

The decoder 111 may output a stream signal after decoding and channel decoding. Here, the stream signal may be a signal in which a video signal, an audio signal and a data signal are multiplexed. As one example, the stream signal may be an MPEG-2 transport stream (TS) signal obtained by multiplexing an MPEG-2 video signal and a Dolby AC-3 audio signal. In detail, an MPEG-2 TS signal may include a 4-byte header and a 184-byte payload.

The decoder 111 may be provided separately according to the ATSC standard and the DVB standard. That is, an ATSC decoder and a DVB decoder may be provided.

The stream signal output from the decoder 111 may be inputted into the controller 170. The controller 170 may perform demultiplexing, video/audio signal processing and the like, output video on the flexible display unit 140 and output audio to the audio output module 160.

The external device interface 122 may connect an external device and the image display device 100 to each other. To this end, the external device interface 122 may include an A/V input/output unit (not shown) or a wireless communication unit (not shown).

The external device interface 122 may be connected, in a wired or wireless manner, to an external device, such as a digital versatile disk (DVD), a Bluray, a game machine, a camera, a camcorder, a laptop computer (notebook) and the like. The external device interface 122 may transfer a video, audio or data signal input from the exterior via the connected external device to the controller 170 of the image display device 100, and also output a video, audio or data signal processed in the controller 170 to the external device. For this, the external device interface 122 may include the A/V input/output unit or the wireless communication unit.

The A/V input/output unit may include a USB terminal, a composite video banking sync (CVBS) terminal, a component terminal, a S-video terminal (analog), a digital visual interface (DVI) terminal, a high definition multimedia interface (HDMI) terminal, an RGB terminal, a D-SUB terminal, and the like to allow video and audio signals of the external device to be inputted into the image display device 100.

The wireless communication unit may execute short-range wireless communication with other electronic devices. The image display device 100 may be connected to the other electronic device via a network according to communication standards, such as Bluetooth, radio frequency identification (RFID), infrared data association (IrDA), ultra wideband (UWB), Zigbee and the like.

The external device interface 122 may also be connected via at least one of various set-top boxes and the aforementioned various terminals, to execute input/output operations with the set-top boxes.

The external device interface 122 may execute data transmission and reception with the 3D viewer 140a.

The network interface 123 may provide an interface for connecting the image display device 100 to a wired or wireless network which includes an Internet network. The network interface 123 may include an Ethernet terminal for connection to the wired network, and use communication standards, such as wireless LAN (WLAN) (Wi-Fi), wireless broadband (Wibro), world interoperability for microwave access (Wimax), high speed downlink packet access (HSDPA) and the like for connection to the wireless network.

The network interface 123 may receive contents or data provided by a contents provider or a network operator via a network. That is, the network interface 123 may receive contents, such as a movie, an advertisement, a game, a VOD, a broadcast signal provided by the network operator, and related information via a network. The network interface 123 may also receive update information related to firmware and update files provided by the network operator. Also, the network interface 123 may transmit data to the contents provider or the network operator.

The network interface 123 may be connected to, for example, an Internet protocol (IP) TV, so as to receive a video, audio or data signal processed in an IPTV set-top box and transfer it to the controller 170 for allow bi-directional communication. The network interface 123 may also transfer signals processed in the controller 170 to the IPTV set-top box.

The IPTV may indicate ADSL-TV, VDSL-TV, FTTH-TV or the like or indicate TV over DSL, Video over DSL, TV overIP (TVIP), Broadband TV (BTV) or the like, according to a type of transmission network. Also, the IPTV may indicate an Internet-accessible Internet TV, and a full-browsing TV.

The storage unit 130 may store programs for signal processing and control by the controller 170, and also store processed video, audio or data signals.

The storage unit 130 may execute a function of temporarily storing a video, audio or data signal input via the external device interface 122. Also, the storage unit 130 may store information related to a predetermined broadcast channel through a channel memory function of a channel map and the like.

The storage unit 130 may include at least one storage medium of a flash memory-type storage medium, a hard disc-type storage medium, a multimedia card micro-type storage medium, a card-type memory (for example, SD or XD memory), a random access memory (RAM), a read-only memory (ROM) (e.g., electrically erasable programmable ROM (EEPROM)), and the like. The image display device 100 may reproduce a file (a video file, a still image file, a music file, a document file, etc.) stored in the storage unit 130 to provide to a user.

FIG. 1 illustrates an exemplary embodiment having the storage unit 130, separate from the controller 170. However, the storage unit 130 may alternatively be configured to be included in the controller 170.

The user input interface 121 may transfer a user-input signal to the controller 170, or a signal from the controller 170 to the user.

For example, the user input interface 121 may receive a user input signal, such as a power on/off, a channel selection, a screen setting and the like from the remote controller 121a, or transmit a signal from the controller to the remote controller 121a, according to various communication standards, such as RF communication, IR communication and the like.

The user input interface 121, for example, may also transfer a user input signal, which is inputted from a local key (not shown), such as a power key, a channel key, a volume key, or a setting key, to the controller 170, for example.

Also, for example, the user input interface 121 may transfer a user input signal, which is inputted from a sensing unit (not shown) for sensing a user's gesture, to the controller 170 or transmit a signal from the controller 170 to the sensing unit (not shown). Here, the sensing unit may include a touch sensor, a voice sensor, a position sensor, a motion sensor and the like.

The controller 170 may demultiplex stream, which is inputted via the tuner 110, the decoder 111 or the external device interface 122 or process the demultiplexed signals, to generate and output signals for outputting video or audio.

The video signal processed in the controller 170 may be inputted to the flexible display unit 140 to be outputted as an image corresponding to the image signal. Also, the video signal processed in the controller 170 may be inputted to an external output device through the external device interface 122.

The audio signal processed in the controller 170 may be outputted to the audio output module 160. The audio signal processed in the controller 170 may be inputted to an external output device through the external device interface 122. Although not shown in FIG. 1, the controller 170 may include a demultiplexer, an image processor and the like.

Besides, the controller 170 may control an overall operation of the image display device 100. For example, the controller 170 may control the tuner 110 to select an RF broadcast corresponding to a user-selected channel or a pre-stored channel.

The controller 170 may also control the image display device 100 by a user command inputted via the user input interface 121 or an internal program.

For example, the controller 170 may control the tuner 110 to input a signal of a channel, which is selected in response to a predetermined channel select command received via the user input interface 121. The controller 170 may then process a video, audio or data signal of the selected channel. The controller 170 may control information related to the user-selected channel to be outputted through the flexible display unit 140 or the audio output module 160 together with the processed video or audio signal.

As another example, the controller 170 may control a video signal or an audio signal, which is inputted from an external device, for example, a camera or a camcorder through the external device interface 122 in response to an external device image reproduce command received through the user input interface 121, to be outputted through the flexible display unit 140 or the audio output module 160.

In the meantime, the controller 170 may control the flexible display unit 140 to display an image. For example, the controller 170 may control the flexible display unit 140 to output a broadcast image inputted through the tuner 110, an externally input image inputted through the external device interface 122, an image inputted through the network interface 123, or an image stored in the storage unit 130.

Here, the image output on the flexible display unit 140 may be a still image or a video, and a 2D or 3D image.

The controller 170 may allow a predetermined object within the image displayed on the flexible display unit 140 to be generated and displayed as a 3D object. For example, the object may be at least one of an accessed web screen (a newspaper, a journal, etc.), an electronic program guide (EPG), various menus, a widget, an icon, a still image, a video, and text.

The 3D object may be processed to have a different depth from the image displayed on the flexible display unit 140. Preferably, the 3D object may be processed to seem to protrude more than the image displayed on the flexible display unit 140.

In the meantime, the controller 170 may recognize a user's location based on an image captured by the capturing element (not shown). For example, the controller 170 may recognize a distance (z-axial coordinates) between the user and the image display device 100. Also, the controller 170 may recognize x-axial coordinates and y-axial coordinates within the image display device 100 corresponding to the user's location.

Although not shown, the image display device 100 may further include a channel browsing processor, which generates a thumbnail image corresponding to a channel signal or an externally input signal. The channel browsing processor may receive a stream signal outputted from the decoder 111 or a stream signal outputted from the external device interface 122, extract an image from the input stream signal, and generate a thumbnail image. The generated thumbnail image may be inputted to the controller 170 as it is or after being encoded. Also, the generated thumbnail image may be inputted to the controller 170 after being encoded into a stream format. The controller 170 may output on the flexible display unit 140 a thumbnail list including a plurality of thumbnail images using the input thumbnail image. The thumbnail list may be displayed in a briefly viewing manner in which the list is displayed on a partial region with displaying a predetermined image on the flexible display unit 140, or in a fully viewing manner in which the list is displayed on most regions of the flexible display unit 140.

The flexible display unit 140 may generate a driving signal by converting an image signal, a data signal, an OSD signal and a control signal processed in the controller 170, or an image signal, a data signal and a control signal received via the external device interface 122.

The present invention illustrates that the flexible display unit 140 is transformable (variable) into a flat form or a curved form. When the flexible display unit 140 is transformed into the curved form like surrounding a user located in front thereof, the flexible display unit 140 may provide the user with intense quality of image and allow the user to feel more involved in an image displayed thereon. The flexible display unit 140 may be implemented by an OLED panel, for example.

The flexible display unit 140 may be configured to provide a 3D image to a user. To view the 3D image, the flexible display unit 140 may be classified into an additional displaying method and an independent displaying method.

The independent displaying method may be configured such that a 3D image can be implemented only by the flexible display unit 140 without a separate 3D viewer 140a, for example, 3D glasses or the like. Various technologies such as a lenticular technology, a parallax barrier technology and the like may be applied as the independent displaying method.

The additional displaying method may be configured to implement a 3D image by using the 3D viewer 140a in addition to the flexible display unit 140. As one example, various methods such as a head mount display (HMD) type, a glass type and the like may be applied. Also, the glass type may be divided into a passive glass type such as a polarized glass type and the like, and an active glass type such as a shutter glass type and the like. The HMD type may also be divided into a passive HMD type and an active HMD type.

The flexible display unit 140 may be implemented as a touch screen so as to be used as an input device as well as an output device.

The driving part 150 may transform the flexible display unit 140 into a flat form or a curved form. The driving part 150 may transmit an electric signal to the flexible display unit 140 such that the flexible display unit 140 can be transformed by itself, or apply a physical force to the flexible display unit 140 directly or indirectly to transform the flexible display unit 140.

The audio output module 160 may output sound by receiving an audio signal processed in the controller 170, for example, a stereo signal, a 3.1 channel signal or a 5.1 channel signal. The audio output module 160 may be implemented into various types of speakers.

Meanwhile, to sense a user's gesture, as aforementioned, the image display device 100 may further include a sensing unit (not shown) having at least one of a touch sensor, a voice sensor, a location sensor, and a motion sensor. A signal sensed by the sensing unit may be transferred to the controller 170 via the user input interface 121.

The controller 170 may sense a user's gesture based on an image captured by the capturing element (not shown), a signal sensed by the sensing unit (not shown) or a combination thereof.

The power supply unit 180 may supply power to every component of the image display device 100. Especially, the power supply unit 190 may supply power to the controller 170 which may be implemented in a form of a system on chip (SOC), the flexible display unit 140 to display an image, and the audio output module 160 to output an audio. Also, depending on embodiments, power may be supplied to a heat generator including a hot wire.

The remote controller 121a may transmit a user input to the user input interface 121. To this end, the remote controller 121a may use various communication standards, such as IR communication, RF communication, Bluetooth, ultra wideband (UWB), Zigbee and the like. Also, the remote controller 121a may receive a video, audio or data signal output from the user input interface 121, so as to display the signal on the remote controller 121a or output the signal on the remote controller 121a in form of sound.

The image display device 100 may be a fixed digital broadcast receiver capable of receiving at least one of ATSC (8-VSB) broadcast programs, DVB-T (COFDM) broadcast programs, and ISDB-T (BST-OFDM) broadcast programs or a mobile digital broadcast receiver capable of receiving at least one of terrestrial DMB broadcast programs, satellite DMB broadcast programs, ATSC-M/H broadcast programs, DVB-H (COFDM) broadcast programs, and Media Forward Link Only (MediaFLO) broadcast programs. Alternatively, the image display device 100 may be an IPTV digital broadcast receiver capable of receiving cable broadcast programs, satellite broadcast programs or IPTV programs.

The image display device disclosed herein may include a TV receiver, a cellular phone, a smart phone, a notebook computer, a digital broadcasting terminal, a personal digital assistant (PDA), a portable multimedia player (PMP) and the like.

The block diagram of the image display device illustrated in FIG. 1 is a block diagram of one exemplary embodiment. Each component of the block diagram may be combined, added or omitted according to the configuration of the image display device 100. That is, if necessary, two or more components may be combined into one component, or one component may be divided into two components. Also, a function performed in each block is merely illustrative, and a detailed operation or device may not limit the scope of the present invention.

Figure 2:
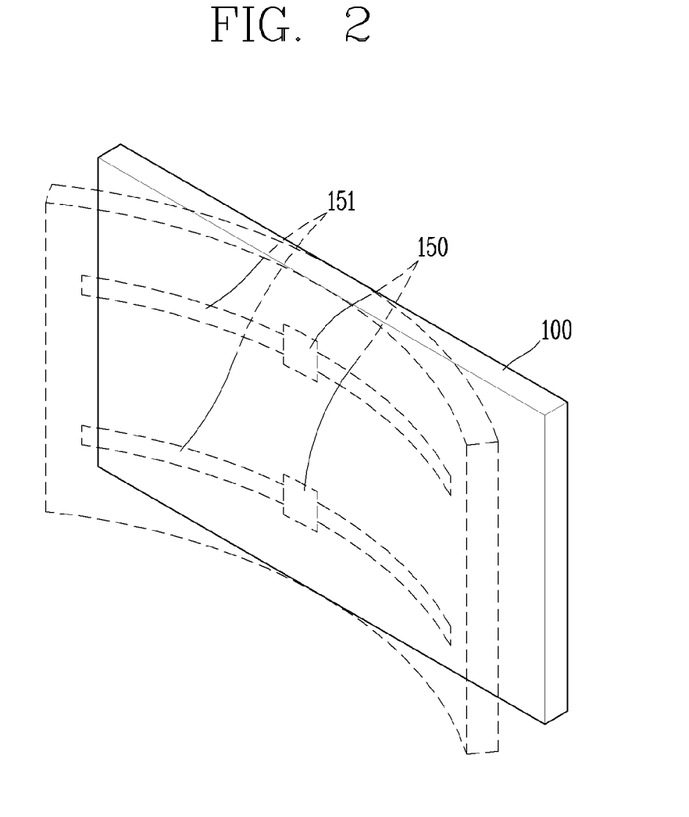
FIG. 2 is a conceptual view illustrating an image display device according to an embodiment of the present invention.

FIG. 2 is a conceptual view illustrating an image display device 100 according to an embodiment of the present invention.

Referring to FIG. 2, a flexible display unit 140 is configured to be bent by an external force, between a first state and a second state having different radiuses of curvature. For instance, the first state may be a state where the flexible display unit 140 is flat, and the second state may be a state where the flexible display unit 140 is bent as a curved surface.

In a case where the flexible display unit 140 is bent, by an external force, so as to enclose a user positioned in front of the flexible display unit 140, the user may be provided with a real picture quality and a sense of immersion. The flexible display unit 140 bent to a curved shape may be restored to a flat shape, by an external force.

Figure 4:
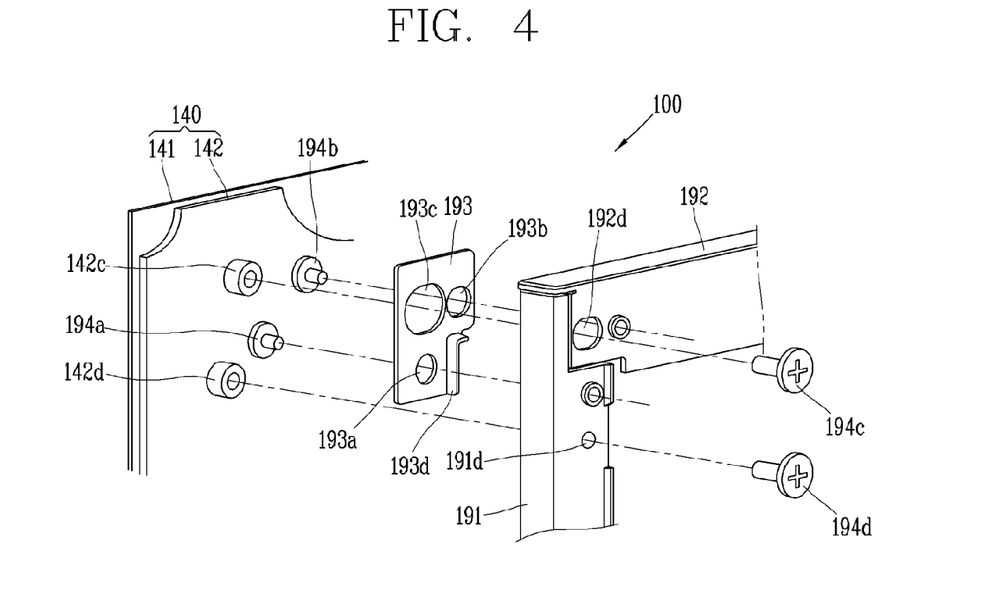
FIG. 4 is an exploded perspective view of the middle cabinet assembly of FIG. 3.
Figure 6:
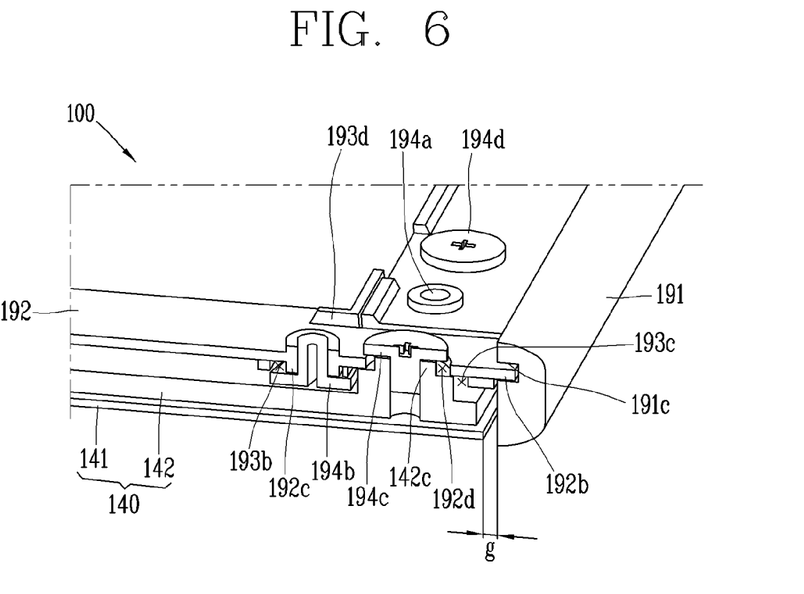
FIG. 6 is a sectional view taken along line 'VI-VI' in FIG. 5.

The flexible display unit 140 includes a panel 141, and a module cover 142 which covers the panel 141 for support (refer to FIGS. 4 and 6). The panel 141 is formed of a flexible panel (e.g., OLED panel), and the module cover 142 which has covered a rear surface of the panel 141 is configured to be transformable together with the panel 141. Preferably, the module cover 142 is formed of an elastically-transformable material (e.g., stainless steel, aluminum, titanium, carbon fiber, etc.).

For bending of the flexible display unit 140, the image display device 100 is provided with a pressing member 151 configured to transform the flexible display unit 140, and a driving part 150.

The pressing member 151 is configured to apply an external force to the flexible display unit 140 by being bent. As shown in FIG. 2, the pressing member 151 may be formed as a bar type plate arranged in a widthwise direction (horizontal direction) of the flexible display unit 140. For a stable driving, the pressing member 151 is provided in plurality in number. For instance, a plurality of pressing members 151 may be disposed to correspond to an upper end and a lower end of the flexible display unit 140.

The driving part 150 is formed to pull two ends of the pressing member 151, so that the pressing member 151 can be bent. Once two ends of the pressing member 151 are pulled by the driving part 150, the pressing member 151 is bent to press the flexible display unit 140. Under such mechanism, the flexible display unit 140 which is in a flat state may be bent to a curved state.

The driving part 150 is configured to pull two ends of the pressing member 151 to a first direction so that a flat state of the flexible display unit 140 can be converted to a bent state. The driving part 150 is also configured to pull the two ends of the pressing member 151 to a second direction different from the first direction, so that the bent state of the flexible display unit 140 can be restored to the flat state.

Accordingly, the flexible display unit 140 may be in a flat state or a bent state according to a direction that the two ends of the pressing member 151 are pulled by the driving part 150.

The pressing member 151 may be disposed in parallel to the flexible display unit 140, and may be configured to press at least part of the flexible display unit 140 when two ends thereof are pulled by the driving part 150. For instance, the module cover 142 may be configured to be bent together with the panel 141 by being pressed by the pulled two ends of the pressing member 151.

The two ends of the pressing member 151 may be in a contact state to the module cover 142, or may be spaced from each other with a prescribed interval therebetween. When pulled by the driving part 150, the two ends of the pressing member 151 slide on a rear surface of the module cover 142 while pressing the module cover 142. The two ends of the pressing member 151 may be slidably coupled to the module cover 142 by a sliding member (not shown) having a rail structure.

Figure 3:
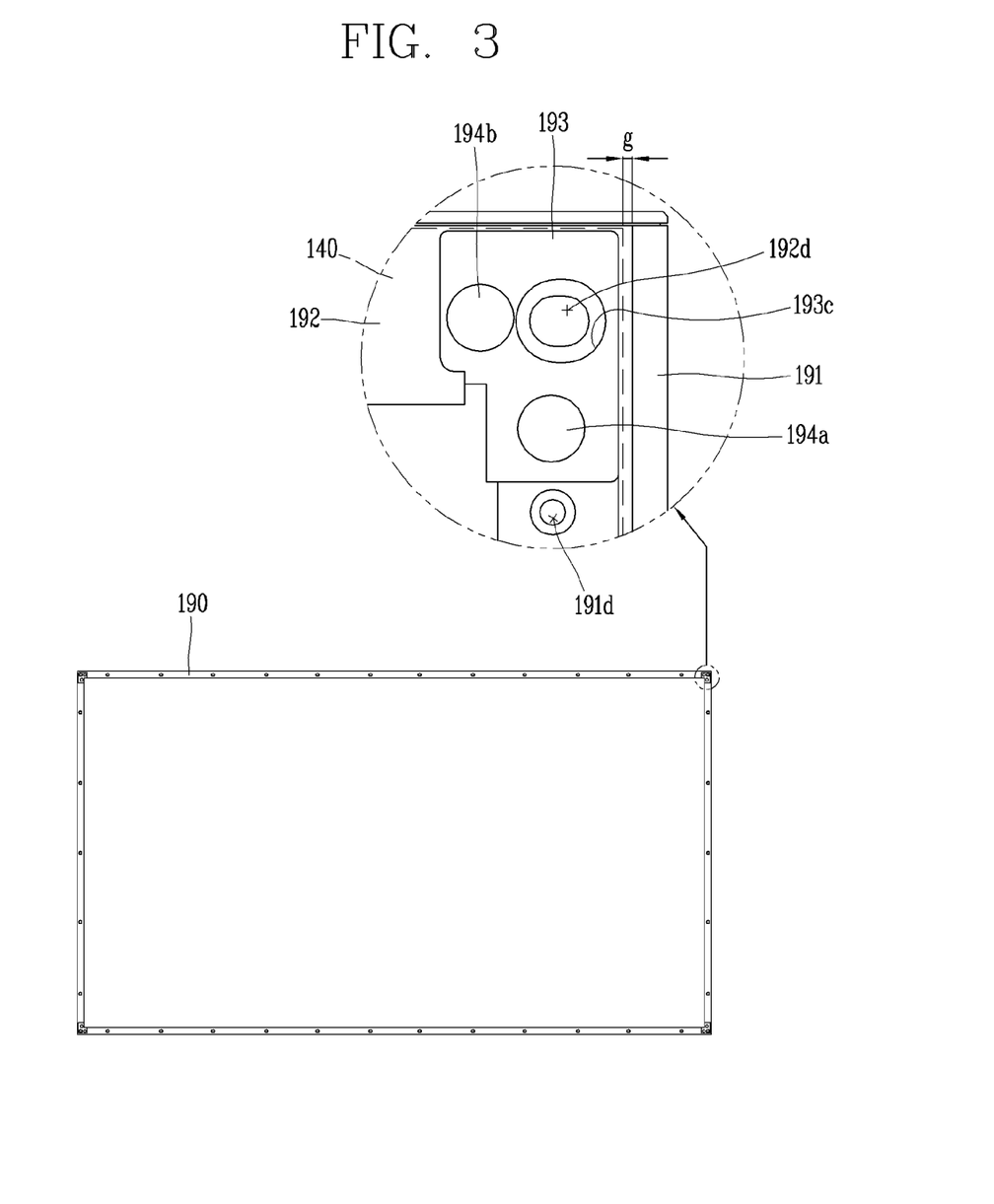
FIG. 3 is a front view of a middle cabinet assembly provided at the image display device of FIG. 2.

FIG. 3 is a front view of a middle cabinet assembly 190 provided at the image display device 100 of FIG. 2. For better understanding, the flexible display unit 140 mounted to the middle cabinet assembly 190 was indicated as a dotted line in FIG. 3.

The middle cabinet assembly 190 is provided with a recessed space where the flexible display unit 140 is mounted. An edge region of the middle cabinet assembly 190 is more protruding than a mounting surface of the flexible display unit 140, thereby covering side surfaces of the flexible display unit 140. That is, the middle cabinet assembly 190 may be configured to cover side surfaces of the flexible display unit 140 except for a front surface of the panel 141.

The middle cabinet assembly 190 is configured to be bent together with the flexible display unit 140, in a case where the flexible display unit 140 is bent to the second state from the first state. In this case, right and left side surfaces of the flexible display unit 140 may contact an inner side wall of the middle cabinet assembly 190 which faces the flexible display unit 140, due to different bent degrees between the flexible display unit 140 and the middle cabinet assembly 190. This may cause damages of the panel 141. Therefore, a structure for preventing such damages of the panel 141 is required.

Figure 5:
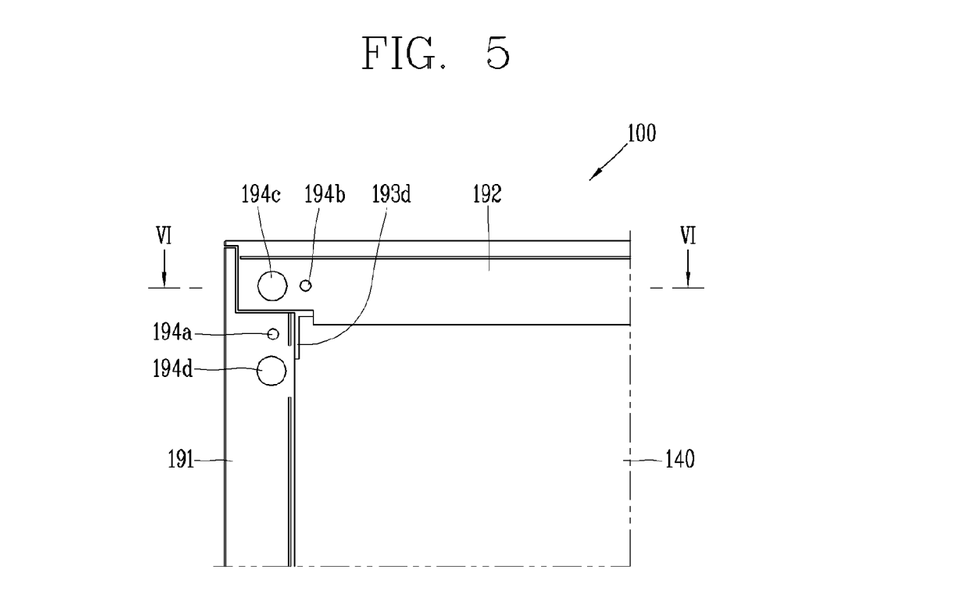
FIG. 5 is a rear view of the middle cabinet assembly of FIG. 3.
Figure 7A:
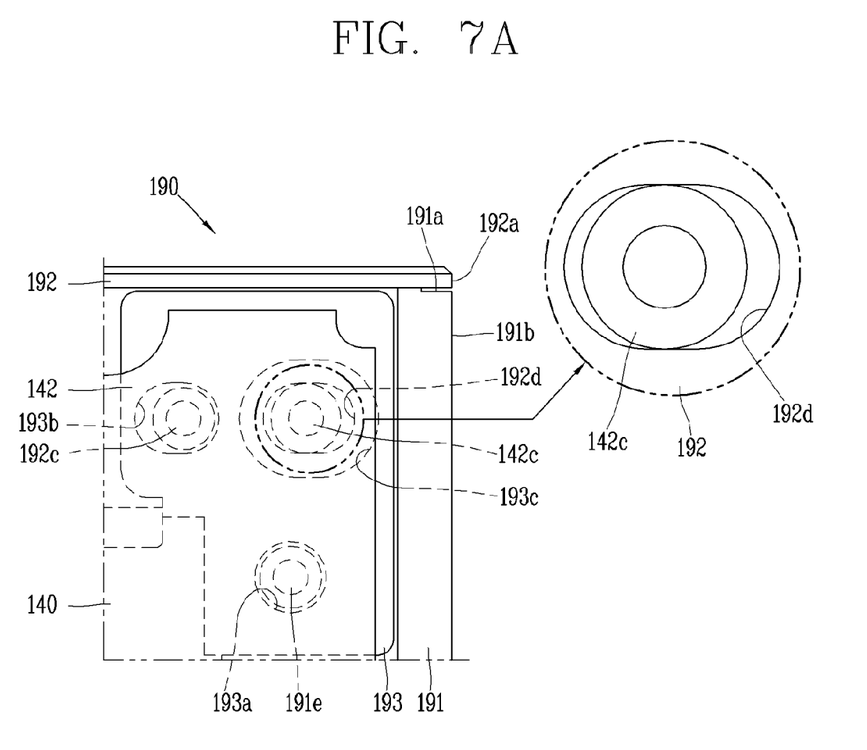
FIGS. 7A and 7B are conceptual views illustrating a mechanism of a middle cabinet assembly implemented as a current state of a flexible display unit is changed into a second state from a first state.
Figure 7B:
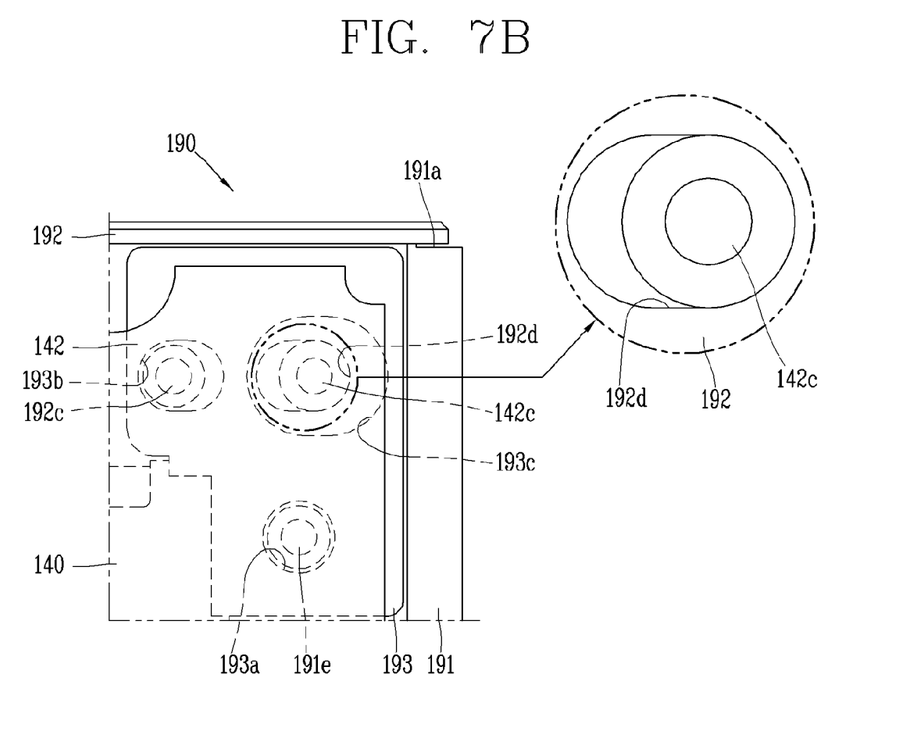

FIG. 4 is an exploded perspective view of the middle cabinet assembly 190 of FIG. 3, FIG. 5 is a rear view of the middle cabinet assembly 190 of FIG. 3, and FIG. 6 is a sectional view taken along line VI-VI' in FIG. 5. FIGS. 7A and 7B are conceptual views illustrating a mechanism of the middle cabinet assembly 190 implemented as a current state of the flexible display unit 140 is changed into the second state (refer to FIG. 7B) from the first state (refer to FIG. 7A).

Referring to the drawings, the middle cabinet assembly 190 includes a first middle cabinet 191 and a second middle cabinet 192. Preferably, the first middle cabinet 191 and the second middle cabinet 192 are formed of an elastically-transformable material (e.g., stainless steel, aluminum, titanium, carbon fiber, etc.).

The first middle cabinet 191 is disposed so as to be coupled to the module cover 142 of the flexible display unit 140, and so as to cover a first side of the flexible display unit 140. In this embodiment, the first middle cabinet 191 is disposed to cover right and left side surfaces of the flexible display unit 140. The right and left side surfaces of the flexible display unit 140 are spaced from an inner side wall of the first middle cabinet 191 by a prescribed gap (g), for prevention of damages of the panel 141 due to contact therebetween.

The second middle cabinet 192 is disposed so as to cover a second side of the flexible display unit 140, the second side perpendicular to the first side. In this embodiment, the second middle cabinet 192 is arranged so as to cover upper and lower side surfaces of the flexible display unit 140.

The second middle cabinet 192 is configured to perform a relative motion with respect to the first middle cabinet 191, when the flexible display unit 140 is transformed between the first state and the second state. The relative motion may be performed between the first state where the flexible display unit 140 is flat, and the second state where two sides of the flexible display unit 140 are forward bent.

The module cover 142 and the second middle cabinet 192 have different elastic transformation ratios due to a difference in material, thickness, etc. Therefore, the second middle cabinet 192 may have a different radius of curvature from the flexible display unit 140 in the second state. Under such configuration, when the flexible display unit 140 is transformed to the second state from the first state, right and left ends 192a of the second middle cabinet 192 may become far from right and left ends of the flexible display unit 140.

If the flexible display unit 140 is transformed to the second state from the first state, the second middle cabinet 192 is moved toward a direction to be far from the first middle cabinet 191 fixed to the module cover 142. On the contrary, if the flexible display unit 140 is restored to the first state from the second state, the second middle cabinet 192 is moved toward a direction to be close to the first middle cabinet 191.

Under such mechanism, even if the flexible display unit 140 which faces the first middle cabinet 191 is transformed, the inner side wall of the first middle cabinet 191 is spaced from the right and left side surfaces of the flexible display unit 140 by the prescribed gap (g). This can prevent damages of the panel 141.

A detailed structure of the middle cabinet assembly 190 will be explained. The following detailed structure of the middle cabinet assembly 190 is merely exemplary, and the present invention is not limited to this. That is, the structure of the middle cabinet assembly 190 may be modified variously by those skilled in the art.

Referring to FIGS. 5 and 6, the end 192a of the second middle cabinet 192, which corresponds to lines VI-VI, may be inserted into a groove 191c of the first middle cabinet 191. When the flexible display unit 140 is transformed to the second state from the first state, the end 192a may be movable to a direction for separation from the groove 191c.

The middle cabinet assembly 190 may further include a fixing member 193 configured to couple the first middle cabinet 191 and the second middle cabinet 192 thereto so that they can perform a relative motion with respect to each other. The fixing member 193 is disposed on a rear surface of the module cover 142, and is configured to cover the end 191a of the first middle cabinet 191 and the end 192a of the second middle cabinet 192.

The fixing member 193 may be provided with a rib 193d supported at an inner side wall of the first middle cabinet 191. The fixing member 193 is coupled to the first middle cabinet 191 by a first coupling member 194a to be explained later, and the rib 193d is supported at the inner side wall of the first middle cabinet 191. Under such configuration, the fixing member 193 may maintain a fixed state to the first middle cabinet 191.

In this embodiment, the rib 193d is bent to cover side walls of the first middle cabinet 191 and the second middle cabinet 192, the side walls adjacent to each other and forming inner edges of the middle cabinet assembly 190. The second middle cabinet 192 may be configured to be locked to the rib 193d when the flexible display unit 140 is restored to the first state from the second state. That is, the rib 193d may serve as a stopper for restricting movements of the second middle cabinet 192.

The module cover 142 may be fixedly-coupled to the first middle cabinet 191, and may be coupled to the second middle cabinet 192 so that the second middle cabinet 192 can perform a relative motion.

More specifically, a first nut 191e protruding from the first middle cabinet 191 is inserted into a first hole 193a of the fixing member 193. A first coupling member 194a is coupled to the first nut 191e, thereby fixing the fixing member 193 to the first middle cabinet 191. The first nut 191e is protruding from the first middle cabinet 191 in the form of a boss, and is provided therein with a threaded rod corresponding to a screw thread of the first coupling member 194a. A second nut 192c and a third nut 142c may also have the same structure as the first nut 191e.

A second nut 192c protruding from the second middle cabinet 192 is inserted into a second hole 193b (slit) of the fixing member 193. A second coupling member 194b is coupled to the second nut 192c, and is slidable on a rear surface of the module cover 142 when the second middle cabinet 192 performs a relative motion. In this case, a slidable range of the second coupling member 194b may be determined by a length of the second hole 193b.

The third nut 142c protruding from the module cover 142 is inserted into a third hole 193c (slit) of the fixing member 193, and a through hole 192d (slit) of the second middle cabinet 192.

A third coupling member 194c is coupled to the third nut 142c, and is moved to be close to or far from the second coupling member 194b during the relative motion. In this case, a slidable range of the third coupling member 194c may be determined by a length of the through hole 192d.

Referring to FIGS. 7A and 7B, even if the flexible display unit 140 is transformed, only the second middle cabinet 192 performs a relative motion with respect to the first middle cabinet 191. Since the module cover 142, the first middle cabinet 191 and the fixing member 193 are in a restricted state, the prescribed gap (g) can be maintained.

If the flexible display unit 140 is transformed to the second state from the first state, the second coupling member 194b and the third coupling member 194c are moved to be far from each other. On the other hand, if the flexible display unit 140 is restored to the first state from the second state, the second coupling member 194b and the third coupling member 194c are moved to be close to each other. In this case, protruding directions of the second nut 192c and the third nut 142c may be opposite to each other.

The end 191a of the first middle cabinet 191 may be configured to be exposed to outside in the second state, but to be covered in the first state. The end 192a of the second middle cabinet 192 may have the same plane as one surface 191b of the first middle cabinet 191 in the first state. Under such configuration, the first middle cabinet 191 and the second middle cabinet 192 may provide integrated feeling in the first state.

However, the right and left ends 192a of the second middle cabinet 192 become distant from the right and left ends of the flexible display unit 140 in the second state. Accordingly, one end 191a of the first middle cabinet 191 is exposed to outside. The end 192a of the second middle cabinet 192 may be formed to be round in order to reduce a stepped portion between the end 191a of the first middle cabinet 191 and the end 192a of the second middle cabinet 192, and in order to provide integrated feeling of the first middle cabinet 191 and the second middle cabinet 192.

Figure 8A:
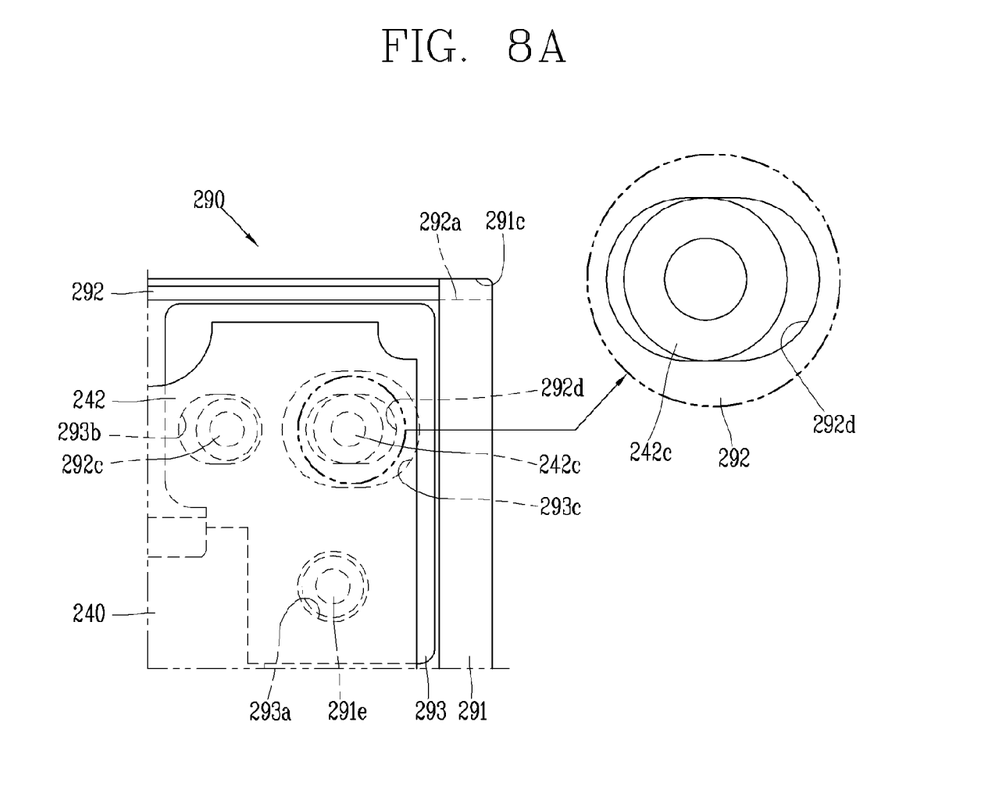
FIGS. 8A and 8B illustrate a modified embodiment of the mechanism of the middle cabinet assembly, the mechanism implemented as a current state of the flexible display unit is changed into the second state from the first state.
Figure 8B:
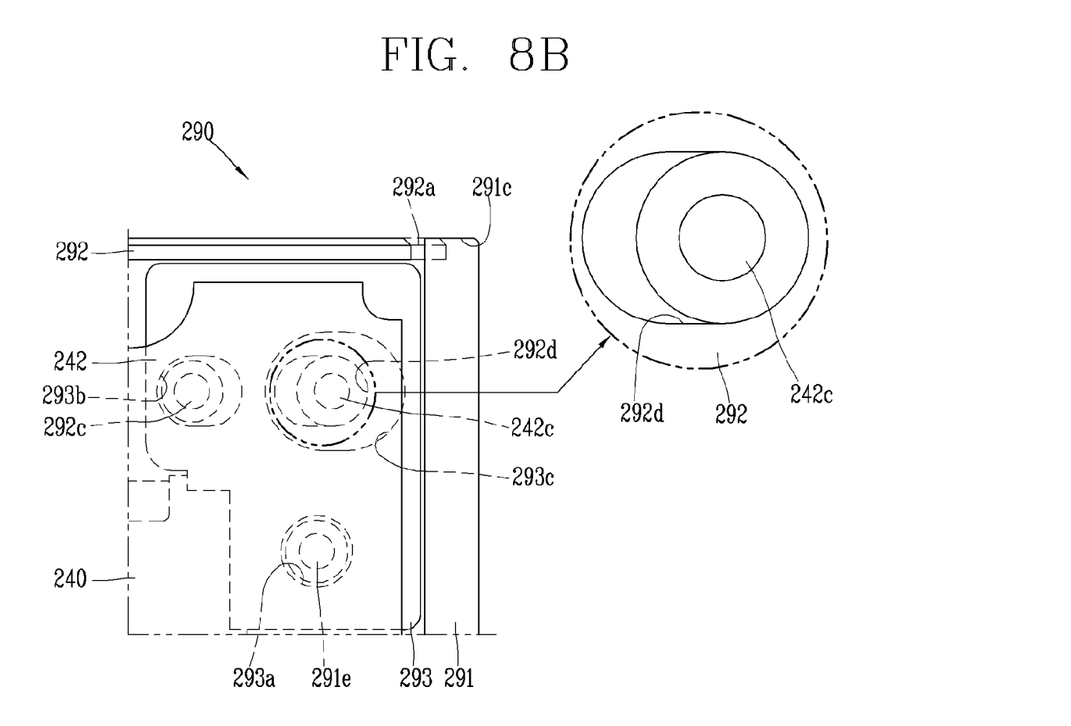

Hereinafter, a modified embodiment of the middle cabinet assembly 190, where the first middle cabinet 191 and the second middle cabinet 192 provide integrated feeling in the second state as well as in the first state, will be explained.

FIGS. 8A and 8B illustrate a modified embodiment of the mechanism of the middle cabinet assembly 190, which illustrate a mechanism of a middle cabinet assembly 290 implemented as a current state of a flexible display unit 240 is changed into the second state from the first state.

Referring to FIGS. 8A and 8B, an end 292a of a second middle cabinet 292 is inserted into a groove 291c of a first middle cabinet 291 in the first state.

The end 292a of the second middle cabinet 292, which has been inserted into the groove 291c in the first state, is configured to be movable to a direction for separation from the groove 291c when the flexible display unit 240 is transformed to the second state. In this case, the end 292a of the second middle cabinet 292, which has been separated from the groove 291c in the second state, may have the same plane as the first middle cabinet 291.

Under such configuration, a stepped portion does not occur even in the second state. As a result, integrated feeling of the first middle cabinet 291 and the second middle cabinet 292 can be provided.

The foregoing embodiments and advantages are merely exemplary and are not to be considered as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

The invention claimed is:

1. An image display device, comprising:
a flexible display unit configured to be bent, by an external force, in a first state and a second state where the flexible display unit has different radiuses of curvature; and
a middle cabinet assembly configured to cover side surfaces of the flexible display unit,
wherein the middle cabinet assembly comprises:
a first middle cabinet coupled to the flexible display unit, and disposed to cover a right side and a left side of the flexible display unit; and
a second middle cabinet disposed to cover an upper side and a lower side of the flexible display unit, the second middle cabinet configured to perform a relative motion with respect to the first middle cabinet when the flexible display unit is transformed between the first state and the second state, and
wherein an inner side wall of the first middle cabinet is spaced from the right and left sides of the flexible display unit by a prescribed gap when the flexible display unit is transformed between the first state and the second state.

2. The image display device of claim 1, wherein the first state indicates a state where the flexible display unit is flat, and the second state indicates a state where right and left sides of the flexible display unit are forward bent in a curved shape, and
wherein the relative motion is performed between the first state and the second state.

3. The image display device of claim 2, wherein the second middle cabinet has a different radius of curvature from the flexible display unit in the second state.

4. The image display device of claim 2, wherein an end of the first middle cabinet is configured to be exposed to outside in the second state, but to be covered in the first state.

5. The image display device of claim 4, wherein an end of the second middle cabinet has the same plane as one surface of the first middle cabinet in the first state.

6. The image display device of claim 4, wherein an end of the second middle cabinet is configured to be inserted into a groove of the first middle cabinet, and to be movable in a direction for separation from the groove when the flexible display unit is transformed to the second state from the first state.

7. The image display device of claim 2, wherein the end of the second middle cabinet is configured to be inserted into the groove of the first middle cabinet in the first state, and to be movable to a direction for separation from the groove when the flexible display unit is transformed to the second state from the first state, and
wherein the end of the second middle cabinet, which has been separated from the groove in the second state, has the same plane as the first middle cabinet.

8. The image display device of claim 1, wherein the flexible display unit comprises:
a panel configured to output visual information; and
a module cover configured to cover a rear surface of the panel for support, and coupled to the middle cabinet assembly.

9. The image display device of claim 8, wherein the module cover is fixedly-coupled to the first middle cabinet, and is coupled to the second middle cabinet such that the second middle cabinet performs a relative motion.

10. The image display device of claim 8, wherein the middle cabinet assembly further comprises a fixing member disposed to cover an end of the first middle cabinet and an end of the second middle cabinet, and configured to couple the first middle cabinet and the second middle cabinet thereto so that they can perform a relative motion with respect to each other.

11. The image display device of claim 10, wherein a first nut protruding from the first middle cabinet is inserted into a first hole of the fixing member, and
wherein a first coupling member is coupled to the first nut, such that the fixing member is fixed to the first middle cabinet.

12. The image display device of claim 11, wherein a second nut protruding from the second middle cabinet is inserted into a second hole of the fixing member, and
wherein a second coupling member is coupled to the second nut, and is slidable on one surface of the module cover when the second middle cabinet performs a relative motion.

13. The image display device of claim 12, wherein a third nut protruding from the module cover is inserted into a third hole of the fixing member, and a through hole of the second middle cabinet, and
wherein a third coupling member is coupled to the third nut, and is moved to be close to or far from the second coupling member during the relative motion.

* * * * *